United States Patent
Kobayashi et al.

[11] Patent Number: 5,995,124
[45] Date of Patent: Nov. 30, 1999

[54] COLOR ELECTROPHOTOGRAPHIC PRINTER WITH BELT CONTROL

[75] Inventors: Shinya Kobayashi, Mito; Kunio Satou, Hitachi; Mamoru Okano, Hitachi; Kazuhito Masuda, Hitachi; Masaya Adachi, Hitachi; Nobuyoshi Hoshi, Hitachinaka, all of Japan

[73] Assignee: Hitachi, Ltd., Tokyo, Japan

[21] Appl. No.: 08/875,140

[22] PCT Filed: Jan. 30, 1995

[86] PCT No.: PCT/JP95/00114

§ 371 Date: Jul. 21, 1997

§ 102(e) Date: Jul. 21, 1997

[87] PCT Pub. No.: WO96/24091

PCT Pub. Date: Aug. 8, 1996

[51] Int. Cl.[6] .................... B41J 2/385; G03G 15/20
[52] U.S. Cl. .................. 347/154; 347/156; 399/313; 399/330
[58] Field of Search ............................ 347/115, 129, 347/154, 233, 102, 155, 156, 212; 358/296; 430/126; 399/40, 320, 307, 335, 328–330, 313; 346/25

[56] References Cited

U.S. PATENT DOCUMENTS 5,745,818  4/1998  Kumasaka et al. ................. 399/40

*Primary Examiner*—N. Le
*Assistant Examiner*—L. Anderson
*Attorney, Agent, or Firm*—Antonelli, Terry, Stout & Kraus, LLP

[57] ABSTRACT

A color electrophotographic printer having a printing process which records a toner image of one color or two colors in a pixel by one exposure. The color electrophotographic printer includes a memory which stores exposure data corresponding to respective pixels of input data of an image, a photosensitive body and at least one charger which charges the photosensitive body. At least one exposing machine exposes respective pixels on the photosensitive body based on the exposure data and a developing machine develops toner of one color or two colors in the exposed respective pixels and forms a toner image. A transfer machine transfers the toner image onto a printing medium and a fixing machine having a belt which fixes the transferred toner image on the printing medium. The belt is controlled so that a relative speed difference occurs between the printing medium and the belt at a position along the belt at least when the developed toner of two colors in one pixel of an image of the printing medium is fixed.

4 Claims, 9 Drawing Sheets

EXPOSURE MEMORY 501

| IMAGE SIGNAL 500 (R,G,B) | COLOR | 1ST EXPOSURE | 2ND EXPOSURE | |
|---|---|---|---|---|
| (0,0,0) | W | E1 | E4 | |
| (1,1,1) | K | 0 | E3 | |
| (1,0,0) | R | E2 | 0 | |
| (0,1,0) | G | E2 | E6 | |
| (0,0,1) | B | E1 | E8* | *PULSE MODULATED |
| (0,1,1) | C | E1 | E7 | |
| (1,0,1) | M | E1 | 0 | |
| (1,1,0) | Y | E2 | E5 | |

COMPACTED IN MAIN SCANNING DIRECTION

COMPACTED IN SUB-SCANNING DIRECTION

| | CONVENTIONAL FIXING DEVICE | INVENTIVE FIXING DEVICE |
|---|---|---|
| CHROMA TICNESS C* | 37 | 43 |
| CONENTRATION △E* | 48 | 55 |

FIG.9A
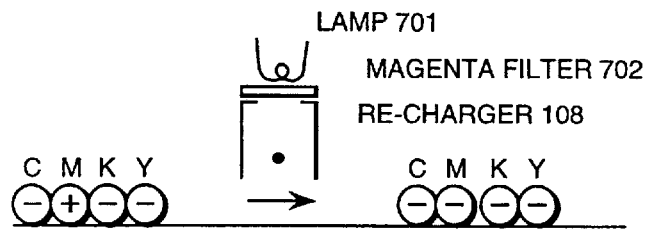
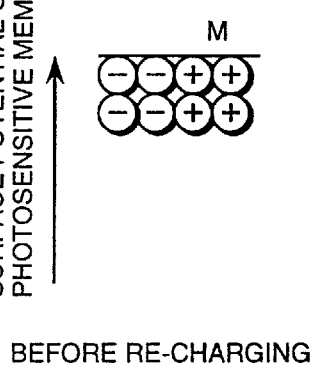
BEFORE RE-CHARGING
FIG. 9B
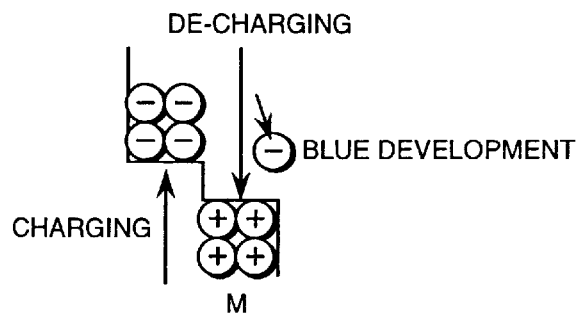
DURING RE-CHARGING
FIG. 9C
FIG.11
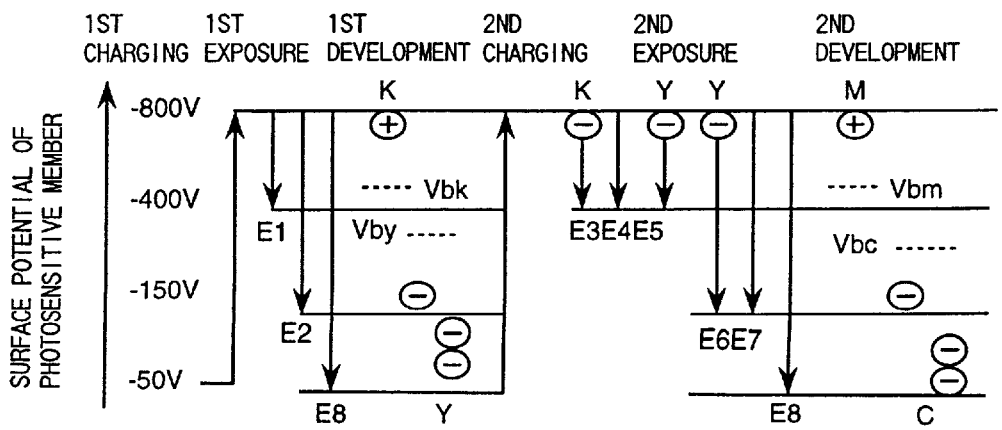

FIG. 10A
FIXING DIRECTION ↓
FIG. 10B
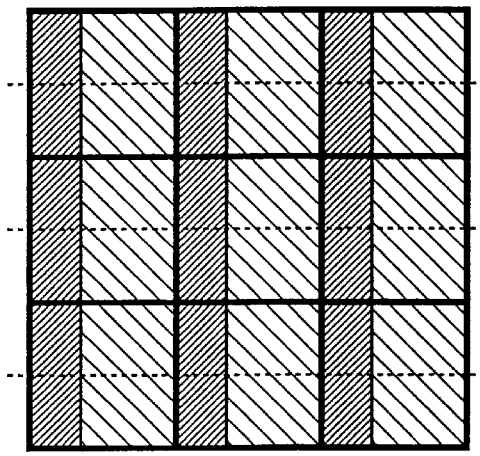
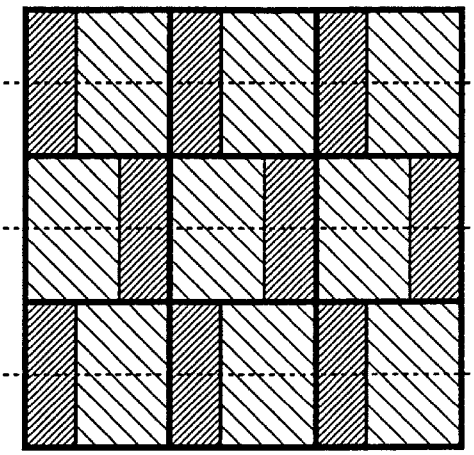
FIG. 10C
FIG. 10D
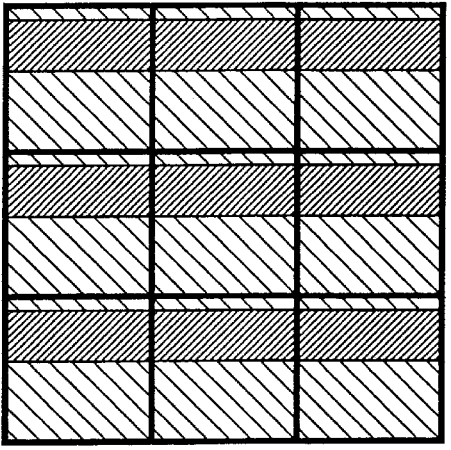
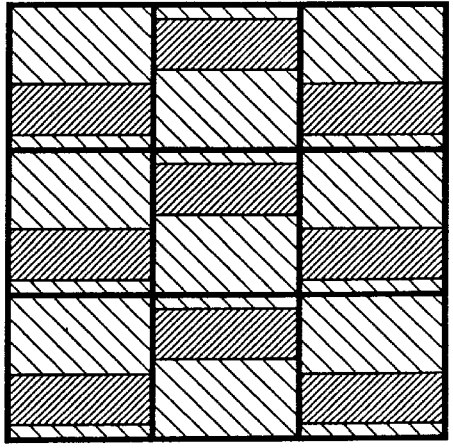

| IMAGE SIGNAL 500 (R,G,B) | COLOR | 1ST EXPOSURE | 2ND EXPOSURE | |
|---|---|---|---|---|
| (0,0,0) | W | E1 | E8 | |
| (1,1,1) | K | E1 | 0 | |
| (1,0,0) | R | 0 | E4 | |
| (0,1,0) | G | E2 | E9 | |
| (0,0,1) | B | E3* | E7,E9 | *PULSE MODULATED |
| (0,1,1) | C | E2 | E9 | |
| (1,0,1) | M | 0 | E7 | |
| (1,1,0) | Y | E1 | E5 | |

COLOR ELECTROPHOTOGRAPHIC PRINTER WITH BELT CONTROL

BACKGROUND OF THE INVENTION

The present invention is directed to a color electrophotographic printer, and especially, the present invention relates to a color electrophotographic printer which can develop a toner image of four colors in two exposure times, or effect a simultaneous exposure of two spots.

A conventional color electrophotographic printer, as disclosed in Japanese patent Laid-open print No. 48-37148, employs a method wherein electrostatic latent images for both normal development and inversion development are formed on a photosensitive member, and wherein two colors of the latent images are developed in one exposure.

On the other hand, electrostatic latent images of four colors are formed in the prior art by two different exposures carried out sequentially, and then the formed electrostatic latent images are developed using four developing units. An example of this method of printing a color image is described in EP0582454A1 (Japanese patent Laid-open print No. 6-115174). As described in Japanese patent Laid-open print No. 6-115174, after the first charging and exposing operations, yellow color (inversion development) and black color (normal development) toner images are developed. After the second charging and exposing operations, the toner images of a magenta color (inversion development) and cyan color (normal development) are developed on the first-mentioned toner images.

In a conventional color electrophotographic printer, toners of a cyan color and a magenta color are physically superimposed on printing paper so as to form top and bottom layers, and the toners of the two colors are then melted and color mixed in the toner fixing unit. This technique of color mixing is referred to as subtraction color mixing and is an important technique to obtain a full-color image with color materials. However, in the apparatus disclosed in Japanese patent Laid-open print No. 6-115174, because toners of two different colors located in the same place on the photosensitive member can not be developed in one exposure, the technique of subtraction color mixing cannot be used.

In order to produce a blue color, color toners of a cyan color and magenta color are adjoined to each other in minute areas, and a high density is obtained by further mixing a black color in the toners. The method of adjoining toners in place is referred to as an additive color mixing method. In the case of the additive color mixing method, when the color materials like toners are color mixed, it is a well-known fact that the chromaticness, as well as the density, becomes small.

Next, because it is impossible to increase only the chromaticness, without increasing the density, by mixing in a black color, a blue color which is bright and has a high chromaticness can not be reproduced at all in a conventional color electrophotographic printer. For these reasons, because the color reproduction range of a record image is narrow, a full-color image with a high picture quality cannot be obtained. In Japanese patent Laid-open print No. 6-115174, it is indicated that the blue color produced by this color mixing method is merely approximated. In the apparatus described in this laid-open print, because two of the three primary colors must be developed by one exposure, at least one of the red, green and blue colors inevitably becomes an approximated color.

SUMMARY OF THE INVENTION

In a technique of the type described in the above Japanese patent Laid-open print No. 6-115174, the present invention has an object to obtain a color mixing image with high chromaticness using a subtraction color mixing method, even in a case where a color toner image of two colors is formed in one exposure.

In a color electrophotographic printer having means for receiving image information from information processors, such as a computer, the color electrophotographic printer of the present invention comprises color judgment means for identifying a pixel for which color mixing is to be expressed by a method of subtraction color mixing based on the received image information, dividing means for dividing the judged pixel into two different areas, exposure means for simultaneously exposing the electrostatic latent images for two colors on a photosensitive member corresponding to the divided pixel, developing means for normally developing and inversely developing the electrostatic latent images of the divided pixel with the different layer thicknesses, transferring means for transferring the developed toner images to a recording medium, and means for fixing a non-fixed toner image on the recording medium, causing an adequate to slide to obtain the desired color.

For example, the electrostatic latent images for two colors can be formed in one exposure. The electrostatic latent image is normally developed at first by using the M (magenta) toner and then is inversely developed by using the C (cyan) toner. As mentioned above, a color mixing image with high chromaticness cannot be obtained unless color mixing is performed using the subtraction color mixing method for the blue color obtained from these two colors. Thus, pixels to be printed are judged to determine whether they are blue, based on the image signal input to the printer. In a case where the color is judged to be blue, the pixel that should be blue is divided into two areas of different size at a certain ratio of areas, a magenta toner is at first applied to the broader area to develop it into a thicker layer than usual. Next, the cyan toner is applied to the narrower area to develop it into a thicker layer than the magenta toner. By doing so, the cyan toner layer which is thicker than the magenta toner layer can physically move more easily on the photosensitive member or the printing sheet surface than the magenta layer. Further, because the electric adhesion force which exists between the surface of the photosensitive member and the magenta toner, whose layer thickness is smaller, is smaller than that between the photosensitive member surface and the magenta toner layer, the cyan toner layer can move on the photosensitive member or paper more easily than the other.

Then, in the latter part of the printing process, including development, re-charging, transferring and fixing, the amount of movement of the cyan toner becomes larger than that of the magenta toner and the cyan toner is physically superimposed easily on the magenta toner. At the time of fixing, when sliding between the non-fixed toner image on the sheet and the fixing device takes place within a proper time period for fixing the toner, the cyan toner which is easier to move can be superimposed on the magenta toner which is harder to move. In this way, because color toners of the two colors can be color mixed during one exposure by the subtraction color mixing method, a color mixing image with high chromaticness can be obtained.

BRIEF DESCRIPTION OF DRAWINGS

FIG. 6A is a block diagram of an image signal processing circuit of the present invention, while

FIG. 9A is a diagram which shows a re-charger, and FIGS. 9B and 9C are diagrams showing surface potential.

FIGS. 10A to 10D are diagrams which show other methods of exposure of the present invention.

FIG. 11 is a diagram for explaining another operation of the present invention.

DESCRIPTION OF THE PREFERRED EMBODIMENTS

Figure 1:
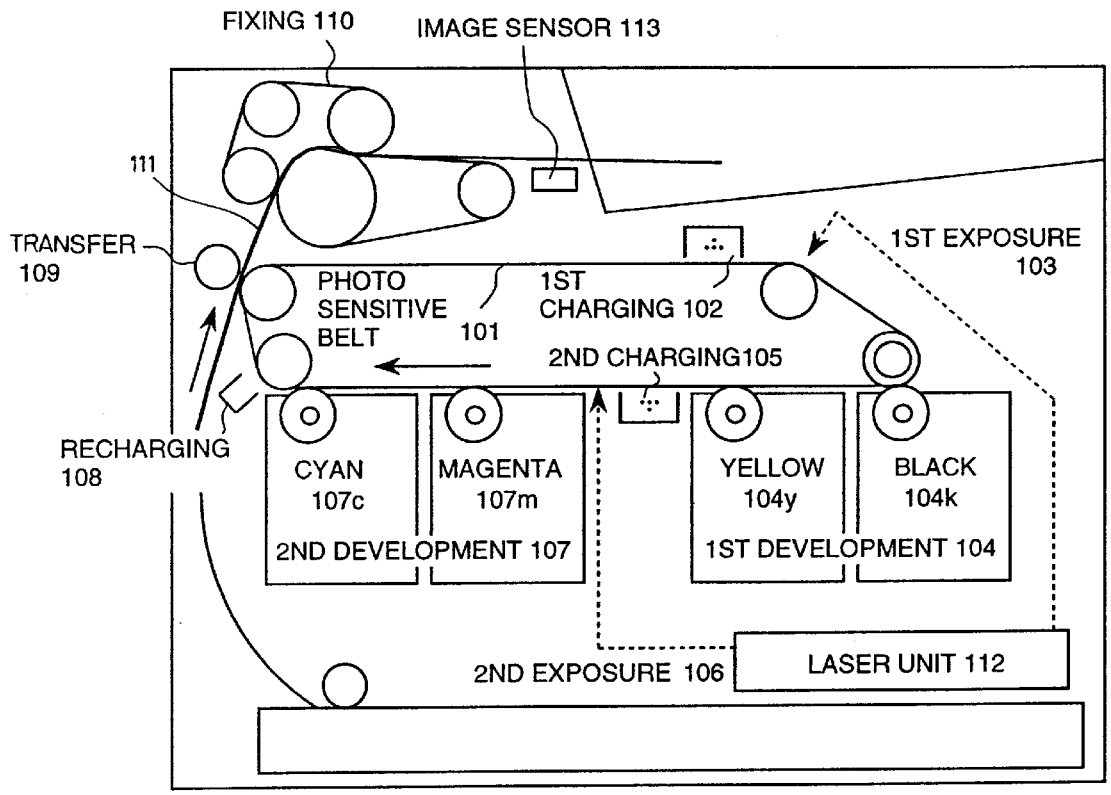
FIG. 1 is a diagram illustrating an example of the overall structure of a color electrophotographic printer of the present invention.

One example of the present invention will be explained by reference to FIG. 1 through FIG. 4. The overall structure of the printer of the present invention is shown in FIG. 1. Around the photosensitive belt 101 there are disposed in the clockwise direction a first charging means 102, a first exposure light beam 103, black development unit 104k and yellow development unit 104y that form the first developing means 104, a second charging means 105, a second exposure light beam 106, a second developing means 107 which includes magenta development unit 107m and cyan development unit 107c, a re-charger 108 and a transferring means 109.

The printing process performed by this equipment is as follows. The photosensitive belt 101 is rotated in the direction of the arrow at a specified speed. First, the surface of the photosensitive belt 101 is uniformly charged by first charging means 102. When a charged photosensitive belt surface is exposed by the first exposure light beam 103 that is supplied from laser unit 112, there is formed an electrostatic latent image corresponding to yellow and black image information. The electrostatic latent image formed by the yellow image information is not only used to form a yellow electrostatic latent image, but a color formed by color mixing yellow with cyan or magenta is also obtained as a part of the electrostatic latent image for the color yellow.

The electrostatic latent image formed on the photosensitive belt is developed using black toner, when it comes to the position of the black development unit 104k. Then, it is developed using yellow toner, when it comes to the position of the yellow development unit 104y. The photosensitive belt surface where the black and yellow toners adhere is then uniformly charged by the second charging means 105. The electrostatic latent images for the cyan and magenta colors are then formed by the second exposure light beam 106. The electrostatic latent images are developed for the toners of each color by magenta developing means 107m and cyan developing means 107c. Then, the charge polarity of the color toner images formed on the photosensitive belt is adjusted by re-charging means 108. The color toner image for which the polarity was adjusted is transferred to sheet 111 by transferring means 109. The color toner image transferred to sheet 111 is melt-fixed by passing it through fixing means 110. The state of the fixed color image is detected by image sensor 113. This detected image information is input into means for controlling the printer (not shown) to control means for charging, means for exposing, development bias, etc.

Two semiconductor lasers are disposed in the laser unit 112, which lasers emit light in response to laser drive electric currents L1 for the first exposure and L2 for the second exposure, which will be described later. The radiated laser beam is deflected by a known laser optical system and scans and exposes the photosensitive belt 101 with the first exposure light beam 103 and the second exposure light beam 106. There are positive charging black and magenta toners in the development units 104k and 107m of this example, respectively. And, there are negatively chargeable yellow and cyan toners in the development units 104y and 107c, respectively. A development bias electric potential, which will be discussed later, is applied to the development roll in each development unit.

Figure 6A:
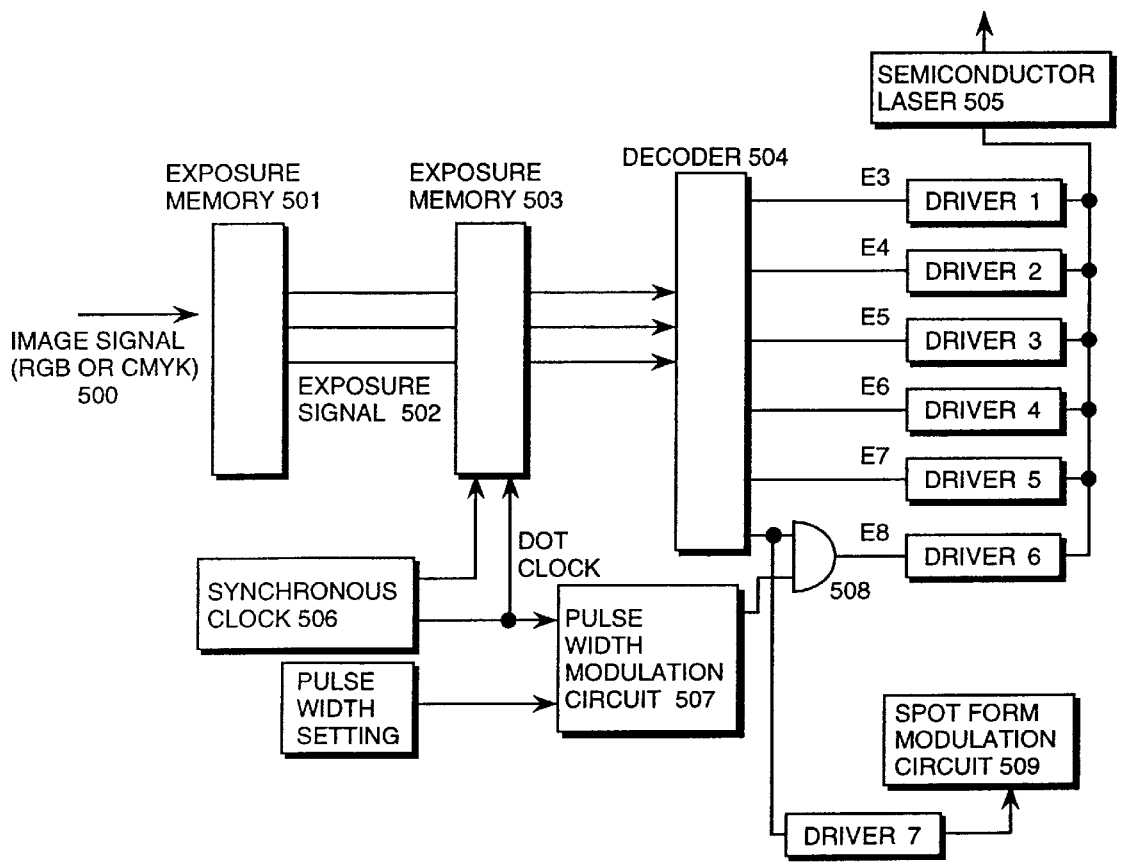

An explanation of the operation of the printer of the present invention now will be presented. An example of an image signal processing circuit is shown in FIG. 6A. Image signal 500 (shown as RGB or CMYK) from the host apparatus is converted into an exposure signal 502 in exposure method memory 501 in which the exposure method in the apparatus of the present invention, which will be described later, is stored. Exposure signal 502 is output to control the first exposure light beam 103 and the second exposure light beam 106. However, the first exposure light beam 103 is almost the same as that provided in the conventional three level exposure method.

Figure 2:
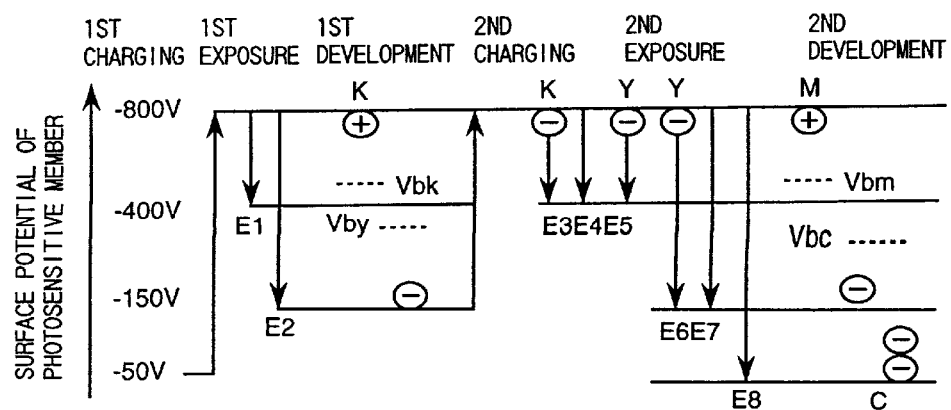
FIG. 2 is a timing diagram relating to the present invention.

As shown in FIG. 2, the photosensitive belt is uniformly charged to a negative level in the apparatus of the present invention. The processing by the first exposure light beam 103 is as follows. The deflection laser light beam, modulated with the black and yellow image color information, is emitted from the laser unit and scanned over the surface of the photosensitive belt which is charged to a negative potential. Control of the optical quantity can effect a change in the colors. An explanation of the processing for the second exposure light beam 106 is omitted because the same circuit structure as shown in FIG. 6A is employed. Exposure signal 502 of 3 bits is output to control the first exposure light 103 and the second exposure light beam 106 and is stored in exposure memory 503.

In this apparatus, there are two exposure points, as shown in FIG. 1, and there is a time difference between a point in time at which the first exposure light beam 103 is irradiated and a point in time at which the second exposure light beam 106 is irradiated. This time difference is also temporarily stored in exposure memory 503 for the purpose of time adjustment. Synchronous clock 506 (line clock, dot clock, etc.) generates clock signals which are also input to the exposure memory 503, Then, exposure signal 502 of 3 bits, used as a switch signal for each laser driver 1 to 6, is supplied via decoder 504, which decodes the signals 502 to 8 lines. Laser drivers 1 to 6 are well-known laser drivers which make semiconductor laser 505 turn ON-OFF at a constant output. Generally, while an output stabilization circuit using an optical sensor is typically installed in the semiconductor laser 505, illustration of this circuit is omitted in the figure.

The laser output sent to each driver 1 to 6 is referred to as E3, E4, ... and E8, respectively. This laser output is expressed here in terms of the amount of exposure on the surface of the photosensitive belt (photosensitive member). However, the input signal to driver 6 for a strong exposure is obtained from an AND circuit 508 as a pulse signal for every dot, the AND circuit 508 having inputs from a well-known pulse-width modulation circuit 507, which can set a pulse width, and the output of the decoder 504, to cause the driver 6 to switch on in a pulse modulated manner. As a result, the input signal to driver 6 becomes a pulse whose width is shorter than the width of one dot. This is a circuit for recording dots which are narrow in the main scanning direction. By the use of this technique, the adhesion area of the normal development toner is determined at first, and then the adhesion layer thickness of the inversion development toner is determined in accordance with the exposure quantity. Of course, the apparatus of the present invention has a sufficient image-resolution in the main scanning direction.

Besides the above method, by using circuit 509 and a well-known element capable of changing the spot shape in a secondary scanning direction, the present invention also can be realized by recording narrow dots in the sub-scanning direction. For example, as shown in the figure, the adhesion areas of the normal development toner and the inversion development toner are first determined by reducing the spot size in the sub-scanning direction in accordance with the output of driver 7. Thereafter, the adhesion layer thickness of each toner is determined in accordance with the exposure quantity.

In the following, the details of this circuit will be explained. This apparatus reproduces seven colors that are necessary for obtaining full-color printing, i.e. black K, red R, green G, blue B, cyan C, magenta M and yellow Y. The operation of the printer of the present invention will be explained by reference to FIG. 2. First, the surface potential of photosensitive belt 101 is charged to −800 V by the first charging means 102. As a matter of fact, the surface potential reduces gradually due to dark damping, but no problem is created by this reduction in surface potential because the difference is only around 20 V. Then, the image is exposed by using the first exposure light beam 103.

1) The place which is to be developed with a black toner is kept at −800 V by effecting no exposure thereof.

2) The place which is to be developed with a yellow toner is strongly exposed to be −100 V by an exposure amount E2.

3) The place which is not developed with any of the toners is faintly exposed to be −450 V by an exposure amount E1.

An electric potential Vbk of −550 V for a developing bias is applied to the developing roll of the black development unit 104k of the first development means, and an electric potential Vby of −350 V for a development bias is applied to the yellow development rolls of yellow development unit 104k, so that the images are developed as desired. Each electric potential is an approximate figure, and the potential amounts can be altered more or less, according to conditions. Next, the surface of photosensitive belt 101 is charged by the second charging means 105 to be −800 V, the same as above. At this time, however, the positively charged black toner is reversed in polarity to the negative polarity. Next, the latent images are exposed by using the second exposure light beam 106.

1) The place which represents black is faintly exposed to be −450 V by an exposure amount E3 on the place which was developed with black toner.

2) The place which represents white is faintly exposed to be −450 V by an exposure amount E4 on the place which was not developed with any of the toners.

3) The place which represents yellow is faintly exposed to be −450 V by an exposure amount E5 on the place which was developed with the yellow toner.

4) The place which represents green is strongly exposed to be −100 V by an exposure amount E6 on the place which was developed with the yellow toner.

5) The place which represents a cyan color is strongly exposed to be −100 V by an exposure amount E7 on the place which was not developed with any of the toners.

6) The place developed with a cyan toner in a layer thicker than usual for forming a blue color, which is to be formed by the subtraction color mixing method, and which will be explained in more detail later, is more strongly exposed to be −50 V by an exposure amount E8 on the place which was not developed with any of the toners.

7) The place which represents red is kept at −800 V by not exposing the place which was developed with the yellow toner.

8) The place which represents a magenta color is kept at −800 V by not exposing the place which was not developed with any of the toners.

However, in exposing the tops of toners, the exposure amounts (E3, E5, E6) are set to be a little bit larger than necessary in consideration of the light absorption in the toner layers. The optical quantity absorbed is predetermined by experiments. An electric potential Vbm of −550 V for a development bias is applied to the developing roll of the magenta development unit 107m of the second development means. An electric potential Vbc of −350 V for a development bias is applied to the developing roll of the cyan development unit 107c.

Figures 3, 5:
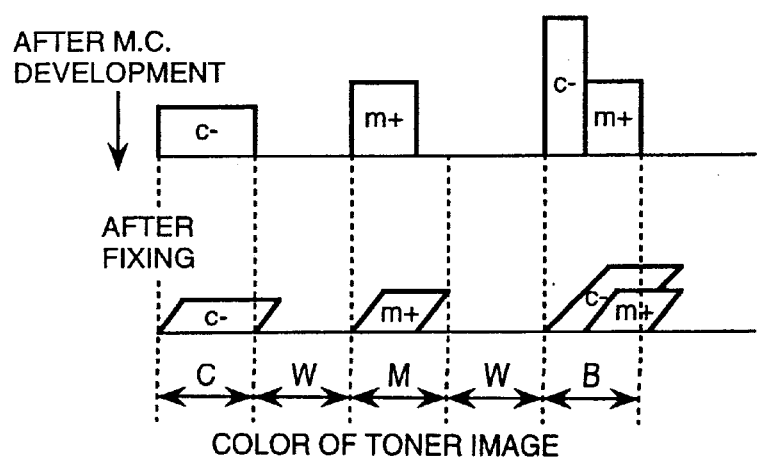
FIG. 3 is a table which shows contents recorded in an exposure memory.
FIG. 5 is a diagram which shows a method of forming the blue color of the present invention.
Figure 6B:
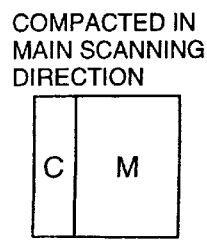
FIGS. 6B and 6C are pixel diagrams.

FIG. 3 is a table which shows a summary of the above exposure method. The contents of FIG. 3 are stored in exposure memory 501. As shown in the table, three pieces of information of 0, E1 and E2 become exposure signals 502 of 2 bits in the first exposure process. In the second exposure process, seven pieces of information of 0, E3, E4, E5, E6, E7 and E8 become exposure signals 502 of 3 bits. By exposing the charged surface in the above manner, the primary colors, other than the blue color, can be reproduced by all ordinary subtraction color mixing methods. Now, a method of forming the blue color by the subtraction color mixing method will be described by reference to FIG. 4–FIG. 6.

Figure 4A:
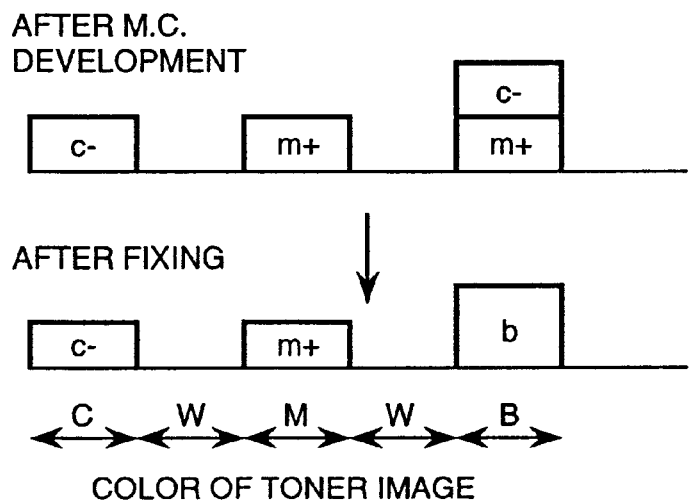
FIGS. 4A and 4B are diagrams showing conventional methods of forming a blue color.

A method of forming the blue color with a conventional apparatus is shown in FIG. 4A, which shows the section of each color on the surface of the photosensitive member after developing the charge image with magenta M and cyan C toners, and indicates the cross section of each color on the sheet after fixing. FIG. 4A expresses the state of 5 continuous pixels, wherein the direction is either the main scanning direction or the sub-scanning direction. When the record signals for cyan, magenta and yellow are denoted as (C,M, Y), the record signals (1,0,0), (0,0,0), (0,1,0), (0,0,0) and (1,1,0) are assigned for every pixel from the left, and they represent cyan C, white W, magenta M, white W and blue B, respectively. In the conventional apparatus, in obtaining a blue color, as shown in FIG. 4A, the cyan and magenta were physically superimposed on the photosensitive member or on the sheet to form top and bottom layers, and then the toners were melted to color mix them in the fixing unit. This method of color mixing referred to as subtraction color mixing, and this is an indispensable technique to obtain full-color printing using color materials.

Figure 4B:
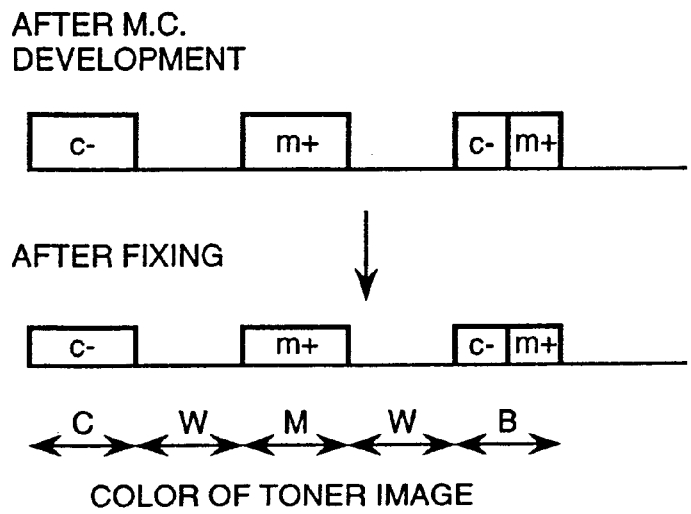

On the other hand, a method of forming the blue color with the apparatus of Japanese patent Laid-open print No. 6-115174 is shown in FIG. 4B. In this conventional apparatus, toners of two colors superimposed on the same pixel of the photosensitive member cannot be developed by one exposure. That is, even if the toners of a cyan and a magenta color are physically superimposed to form top and bottom layers on the photosensitive member, the toners cannot be color mixed in the conventional apparatus. Thus, in the obtaining blue color in the conventional apparatus, as shown in FIG. 4B, the color toners of cyan and magenta are merely adjoined to each other in minute areas. In this case, the two colors of cyan and magenta do not mix even after fixing, thereby to produce a blue color of low chromaticness.

In FIG. 5, there is shown a method of forming the color blue using the apparatus of the present invention. In forming the blue color using the present invention, exposure is effected by the second exposure light beam 106 so that the layer thickness of adhered cyan toner and magenta toner become thicker than that of the conventional layer, as shown in FIG. 2. In FIG. 5, while the thickness of the cyan layer as shown at the left end is the conventional layer thickness, the thicknesses of the cyan and magenta layers shown at the right side are thicker than that. However, each toner is not adhered to the entire area of one pixel, but each is adhered to an area which is narrower than one pixel, as shown in the figure. As a result, the total volume of the toner adhered per one pixel becomes almost the same as that of the blue formation method used with the conventional apparatus, as shown in FIG. 4A.

When examined in more detail, it is seen that the toner layer of the magenta color, which is developed at first in the second development means, has a wider area than the adhesion area of the cyan toner, which is developed later and is thinner than the cyan layer. However, when the layer thickness of a toner image produced by the magenta developing unit in the preceding step is thick, the toner image is likely to be scratched off by the cyan developing unit in the later step. In explaining the developing characteristics of the toner further, the toner layer which needs to be greatly changed in thickness should be the one involved in the inversion development. In this example, an adhesion area of the negatively charged cyan toner involved in the inversion development is narrowed, but the layer thickness of the toner is increased by a strong exposure.

On the other hand, it is very difficult to adjust the layer thickness of the magenta toner involved in the normal development by exposure because the inclination of the sensitivity curve versus the exposure quantity of the photosensitive member is very abrupt. Thus, the adhesion quantity of the normally developed magenta toner in the pixel is adjusted by setting a pulse width in the pulse-width modulation circuit 507 of FIG. 6A. That is, the adhesion quantity is adjusted by area without changing the layer thickness. By using a strong exposure corresponding to the area remaining in the pixel, the layer thickness of the adhered cyan toner involved in the inversion development is increased so that the total adhesion volume is adjusted. On this occasion, the area of the magenta toner is set to be larger than that of the cyan toner, and the layer thickness of the cyan toner becomes thicker than that of the other layer. When a pulse width in the pulse-width modulation circuit 507 of FIG. 6A is set to be small, and at the same time, when the exposure quantity E8 is adjusted by driver 6 to make the total volume of the adhered toner constant, as was explained above, the pixel toner arrangement shown in FIG. 6B is realized.

Figure 6C:
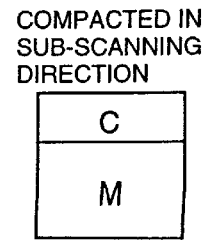

When the laser spot size in the sub-scanning direction is shortened, the area of the part which is developed with cyan toner becomes small, as shown in FIG. 6C. On the contrary, the area of the part which is developed with magenta toner is enlarged. Because the layer thickness of the conventional toner is adjusted to the layer thickness of the highest chromaticness, a further increase in the layer thickness will not lead to improvement in the coloring, even if the developed images are fixed. Thus, the apparatus of the present invention is provided with means for physically mixing cyan toner and magenta toner, so that the layer thicknesses thereof are increased in the fixing unit 110.

Figures 7, 8:
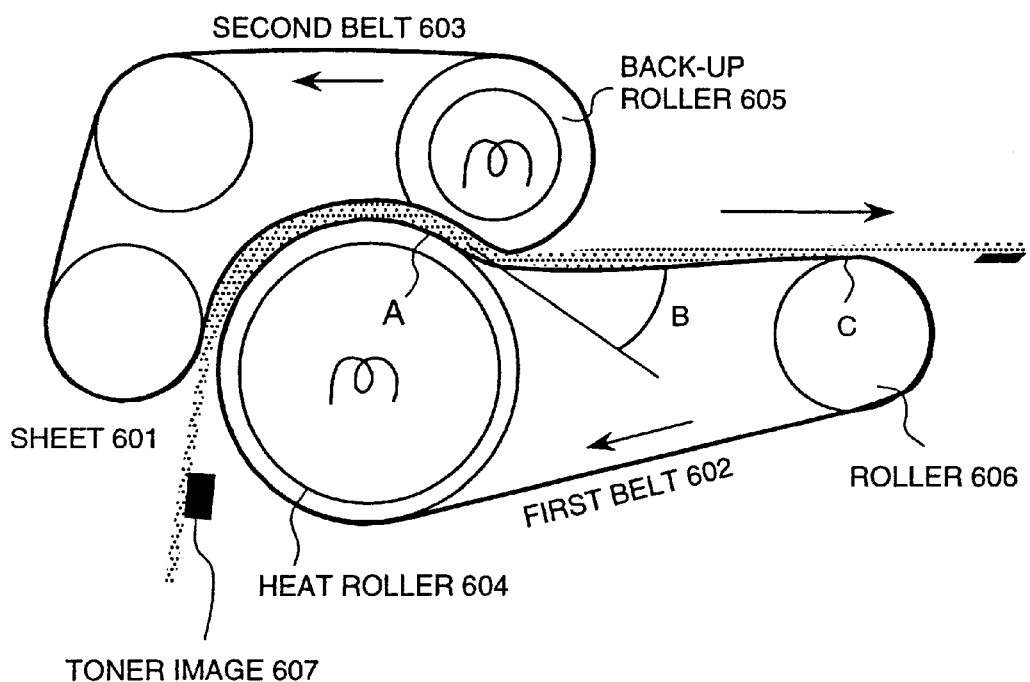
FIG. 7 is a diagram which shows a belt fixing device of the present invention.
FIG. 8 is a chart which shows coloring characteristics obtained by color mixing of cyan and magenta.

In the following, the fixing device and fixing method will be explained with reference to FIG. 7. The belt fixing device, in which the paper is held between the first belt 602 and the second belt 603, in the apparatus of the present invention, is shown in FIG. 7. Sheet 601 onto which a non-fixed toner image was transferred is conveyed around metallic heat roller 604, which has a heat source therein. Toner 607 on the sheet 601 is preheated during that time. Then, toner 607, being held between rubber backup rollers 604, 605, one of which has a heat source therein, is fixed by heat and pressure. The sheet has been shown as being carried in a clockwise direction in FIG. 7, but it bends toward the right immediately downstream of both rollers 604, 605 (at point A), and thereafter, it goes straight ahead together with the substantially horizontal upper run of the first belt. Therefore, there arises a relative speed difference between the first belt 602 and sheet 601 after point A, because a pressure is not applied thereto and both deviate from each other gradually in accordance with the traveling distance.

The toner fixed at the point A has fluidity until it is cooled and solidified. Because the toner is still soft, while the sheet advances several cm from point A, the toner image also deviates followed by deviation between the first belt 602 and sheet 601 in this apparatus. This is because a phenomenon generally referred to as hot offset locally occurs. At exfoliation point C constituted by the first belt 602 and sheet 601, the toner is sufficiently cooled, and thus hot offset does not occur at this point.

The following approximate solution of the deviation quantity S between the first belt 602 and sheet 601 is obtained by a calculation using the radii Rh and Rb of heat roller 604 and backup roller 605, the thicknesses Db and Dp of the first belt 602 and sheet 601, and the angle B (radian) constituted by the tangential direction at point A indicated in the figure and a straight advancing direction of sheet 601 exfoliated from backup roller 605.

$$S = \frac{(Db+Dp)}{2}\left(\frac{x}{Rh}+B\right)$$

Because x is the traveling distance from point A, which is the distance within which the toner hardens, x is several cm. This changes in accordance with the kind of toners used and the conditions for fixing. The deviation quantity S is approximately 10 μm per x=1 mm in case of this apparatus. The important point is that, when the angle B is changed, the deviation quantity S can be controlled. Thus, the angle B can be adjusted in this apparatus. The deviation quantity S of the toner image can be adjusted so that deviation is one dot width or so in this fixing machine. When the deviation becomes larger, the image resolution declines. When the deviation quantity S is controlled to be one dot width as shown in FIG. 5, the cyan toner and the magenta toner images that represent the blue color after development are so fixed after development that the cyan toner is superimposed on the magenta toner. As shown in FIG. 4A, the blue color can be colored by the same subtraction color mixing as the conventional apparatus in which two layers of toners are superimposed. As a result, a blue color with high chromaticness can be obtained. Adjustment of the angle B is controlled by actual measurements of the angle obtained from experiments. The adjustment can be automatically carried out by the image sensor 113 shown in FIG. 1, which is a well-known photosensor.

While one of the results providing an improvement in the blue chromaticness provided by this fixing unit is shown in FIG. 8, the density of toners as well as the chromaticness becomes high at the same time. Therefore, a blue test image is recorded so that the chromaticness or density is measured by image sensor 113. In addition, the single line-width of a cyan color or a magenta color is measured, and the position of the roller 606 is changed automatically so that both colors become compatible. As a result, it is possible to obtain a stabilized picture quality even if the deviation quantity S changes due to the environment and aging.

In producing a blue color from the cyan and magenta colors, when exposed by the pulse-width modulation in the main scanning direction and when exposed as shown in FIG. 10A, a subtraction color mixing is hard to achieve, due to the deviation in the fixing apparatus. Then, as shown in FIG. 10B, if the positions to be printed with the cyan and magenta colors are changed for every line, the subtraction color mixing is easy to achieve. In case the spot sizes in the sub-scanning direction and the main scanning direction are modulated and exposed, it is hard to overlap toners uniformly, due to a deviation produced by the fixing apparatus when exposed as shown in FIG. 10C. Then, if the positions to be printed with the cyan and magenta colors are changed for every line, as shown in FIG. 10D, a uniform subtraction color mixing is carried out.

Re-charger 108 of a FIG. 1 will be explained by reference to FIG. 9A. Its structure is shown in FIG. 9A. Re-charger 108 charges the positive charge toner, among the toners of bipolarity developed on the photosensitive member, to a negative charge toner, which can be electrically transferred in the transferring device 109. In this example, the black and the yellow toners of the four color toners developed on the photosensitive member at the location of the re-charger 108 are already charged to be negative by the second charger 105. The cyan toner is negatively charged from the beginning, and the magenta toner is the only positively charged toner, which should be the toner whose polarity should be reversed by the re-charger 108 after all.

In order to effect efficient transfer, not only should the polarity of the toner be uniform, but also the amount of charge on the toner should be a proper value at the transferring point 109. That is, it is known that, if the charging quantity is larger or smaller than a proper value, the transferring efficiency declines. Because the toner is uniformly charged irrespective of the charge polarity in the conventional apparatus, the charging quantity which already has been charged negative is essentially larger than the charging quantity of the toner that is changed from the positive polarity to the negative polarity. Especially, this tendency was remarkable in transferring at high speed, and both toners could not be transferred efficiently.

In this example, as shown in FIG. 9A, lamp 701 and magenta transmission filter 702 were installed in the rear of the re-charger, and light having the magenta color was irradiated simultaneously with re-charging. In FIG. 9B, the surface potential of the photosensitive member before re-charging is shown. In FIG. 9C, there is shown the surface potential of the photosensitive member at the time of re-charging. Because the magenta toner M transmits the magenta colored light best, the discharging lowers the surface potential of the photosensitive member below that of the magenta. When the surface potential is high, the electric current from the charger to the photosensitive member becomes small, and the quantity of charge in the toner which has adhered to the photosensitive member does not become so large. But, when the surface potential becomes low, the electric current from the charger to the photosensitive member increases, and the quantity of charge on the toner which has adhered to the photosensitive member also increases. Therefore, when the quantity of charge on the toners whose negative charging quantity is easily made larger, other than magenta, is repressed, and when magenta M whose negative charging quantity is easily decreased increases the quantity of charge on the toner, transferring unit 109 operates to uniformly transfer the image. The cyan toner for representing the blue color is developed with a large layer thickness, according to the exposure method of the present invention. In this case, the toner material near the surface of the cyan toner layer which is remote from the photosensitive member is easy to move. This toner material will tend to scatter on the magenta layer in the neighborhood, as shown in FIG. 9C. As a result, the method of color mixing of the cyan and the magenta is similar to the subtraction color mixing method, so that reproduction of a vivid blue is possible.

In this example, the positive and negative toners that should be color mixed by the subtraction color mixing method in the second development process are developed. On the occasions described above, development is carried out so that the layer thickness of the inversion developing toner (the cyan toner in this example) becomes thicker, but in this example, the cyan is developed at the end of the second development process, and a cyan toner layer of large thickness is not mechanically scratched off by the developing machine for other colors. Then, an advantage of the subtraction color mixing method becomes remarkable, and color reproduction is improved further.

In the apparatus of this example, the problem of scratching off, which is described below, was not considered. While a method for producing seven colors in order to provide full color printing is shown in FIG. 2, red R in this case is not easily reproduced. Red R is developed and transferred by laminating the yellow toner in the first development process and the magenta toner in the second development process up and down. However, when the last cyan developing unit 107c develops the yellow toner which is charged negative by the first development process with the cyan toner, the cyan toner is electrically pulled to the developing unit side and is scratched off by the cyan toner so that the cyan toner is taken into the cyan developing unit by the cyan toner developing roll.

In FIG. 2, because an electric potential Vbc of −350 V for the developing bias is applied to the developing roll of the cyan developing unit 107c, and because the surface potential of the photosensitive member on which the yellow toner is deposited is −800 V, a reverse voltage of 450 V is applied between the photosensitive member and the developing roll, and thus it will be easily understood that the yellow toner is drawn into the cyan development unit 107c by means of the cyan toner developing roll.

In order to avoid this phenomenon, as shown in FIG. 11, regarding the pixel for forming the red color in the first exposure process, the exposure quantity and exposure timing for developing the yellow toner are made equal to the exposure quantity and exposure timing for the cyan toner in the pixel which forms the blue color. That is, the exposure quantity is E8, and the exposure timing and the signal processing circuit are as shown in FIG. 6A as for the cyan toner. In addition, in the second exposure process, only the portion above the adhered yellow toner is exposed by the exposure amount E5. Then, on the photosensitive member, the cyan color of the blue toner and magenta toner shown in FIG. 5 is substituted for the yellow. Therefore, vivid red is reproduced as in the case of the blue, and the subtraction color mixing method is realized at the time of re-charging and fixing.

Figure 12:
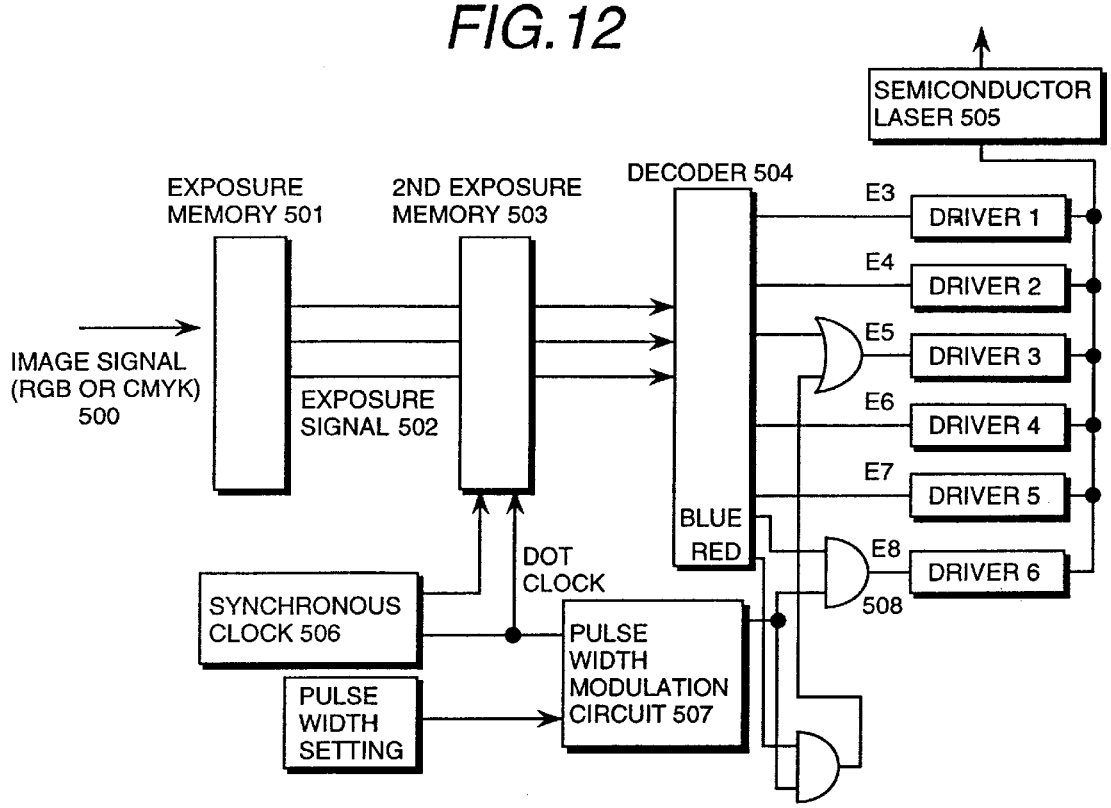
FIG. 12 is a block diagram of an image signal processing circuit of the present invention.

A circuit for signal processing in the case of producing the color red is shown in FIG. 12. A red signal indicating that the pixel to be printed is red is formed in the same way as in the blue case, using the pulse-width modulation circuit 507 to control driver 3. The red signal is logically combined in an AND gate with the output of the modulation circuit 507. The result is applied as the drive signal E5 of driver 3.

In this example, the surface potential of the photosensitive member on which the yellow toner for forming red is placed becomes −450 V, so that the difference with development bias electric potential Vbc=−350 V of the development roll of cyan development unit 107c becomes 100 V, and so yellow toner is not drawn into cyan developing unit 107c, because this example method piles colors on the photosensitive member. The position dislocation between an image produced by the first exposure and an image produced by the second exposure becomes an average of 20 μm or less, which is quite small. If the size of one pixel is 3 times or more (400 dots/inch in this example) that of the position dislocation, an advantage of this example is apparent.

Figure 13:
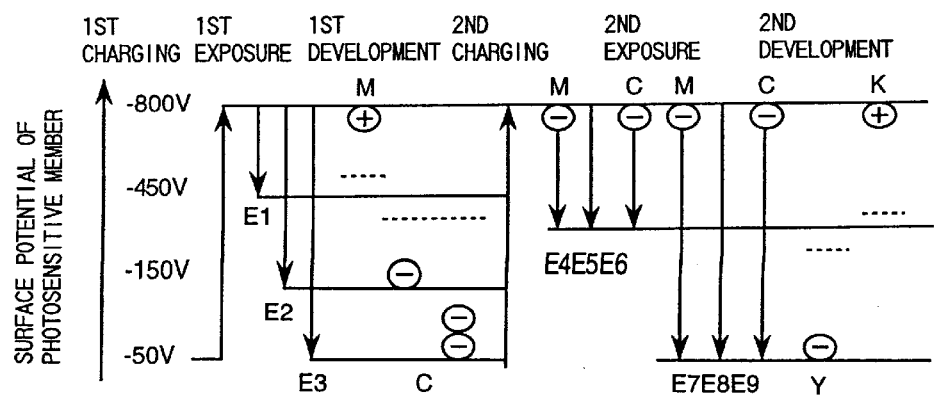
FIG. 13 and FIG. 14 are diagrams showing other operations of the present invention.

Another example of the present invention will be explained by reference to FIG. 13. In this example, the first developing means and the second developing means are reversed in position with respect to the former example shown in FIG. 1. That is, the apparatus of FIG. 1 was arranged to develop the magenta with a positive charging and the cyan with a negative charging in the first developing means and to develop the black with a positive charging and the yellow with a negative charging in the second developing means. As shown in FIG. 13 of this example, the cyan and the magenta toners are charged in the negative by the second charging process. Then, because the surface of the photosensitive member to which the toners are adhered is exposed by the second exposure light so that the absolute value of the surface potential of a photosensitive member becomes smaller than −450 V, electrical scraping at the time of the second development process does not occur, unlike in the former example.

Figures 14, 15:
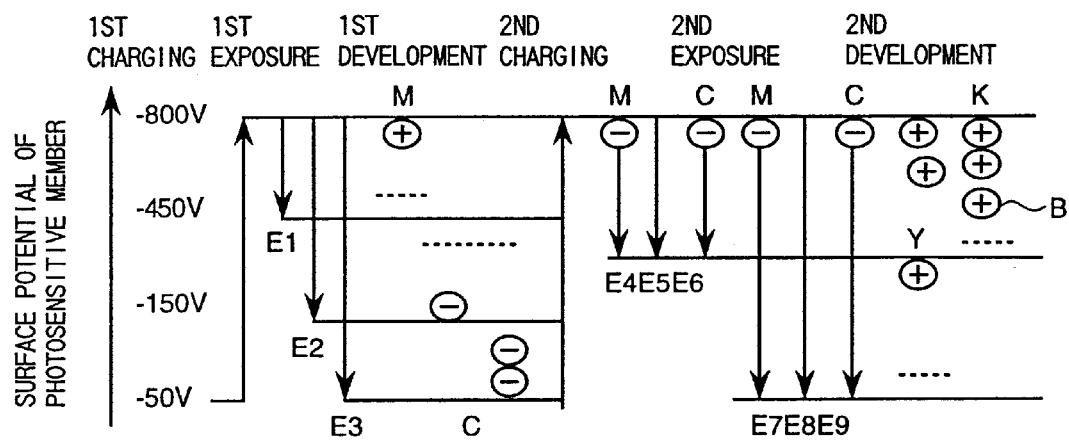
FIG. 15 is a chart showing the contents recorded in the exposure memory.

Another example of the present invention will be explained with reference to FIG. 14 and FIG. 15. This example uses a positive charging toner as a yellow toner in the example of FIG. 13 and uses the blue toner with positive charging instead of the black toner in the former example. That is, the magenta toner with a positive charging and the cyan toner with a negative charging were developed in the first developing means and the yellow toner with a positive charging and the blue toner with a positive charging were developed in the second developing means. The exposure quantities in the first and second exposures are shown in FIG. 15. Especially, in case a black color is represented, the yellow and blue toners adhere simultaneously to cause color mixing to take place in the second development process. Because in this example the cyan and the magenta toners are charged negative by the second charging process, as shown in FIG. 14, and because exposure is performed in such a manner that the absolute value of the surface potential of the photosensitive member becomes smaller than −450 V due to the second exposure, no electrical scraping of any colors occurs in the second development process, unlike the former example.

As has been described above, according to the present invention, because the positive and negative toners to be developed by one exposure can be physically color mixed, color images with high picture quality can be obtained by the subtraction color mixing method, wherein the color reproduction range can be enlarged. Further, because the electrical scraping phenomenon of the first development image in the second development process can be reduced, color mixing in the developer can be prevented to obtain a stabilized color reproduction.

As mentioned above, a color electrophotographic printer according to the present invention can be applied to printing devices, such as a color copier and a color facsimile, as well as to a printer, and a small printing apparatus with high print quantity can be accomplished.

What is claimed is:

1. A color electrophotographic printer having a printing process which records a toner image of one color or two colors by one exposure, comprising:

a memory which stores exposure data corresponding to respective pixels of input data of an image;

a photosensitive body;

a charger which charges said photosensitive body;

an exposing machine which exposes respective pixels on said photosensitive body based on said exposure data;

a developing machine which develops toner of one color or two colors in said exposed respective pixels and forms a toner image;

a transfer machine which transfers said toner image onto a printing medium;

a fixing machine having a belt and which fixes said transferred toner image on said printing medium;

wherein said fixing machine is configured to control said belt so that a relative speed difference occurs between said printing medium and said belt at a position along said belt at least where said developed toner of one color or two colors in one pixel of an image of said printing medium is fixed.

2. The color electrophotographic printer according to claim 1, further comprising a pulse width modulation part which determines a toner adhesion area of a normal development and an inversion development so as to develop said toner of two colors in said one pixel, wherein said exposing machine exposes said toner adhesion area of said one pixel for a determined toner adhesion thickness.

3. The color electrophotographic printer according to claim 2, wherein said toner adhesion area of said inversion development is larger than said toner adhesion area of said normal development and said determined toner adhesion thickness of said inversion development is less than said toner adhesion thickness of said normal development in said one pixel.

4. A color electrophotographic printer, comprising:

a photosensitive body;

a first charger and a second charger which charge said photosensitive body;

a memory which stores exposure data corresponding to respective pixels of input data of an image;

a first exposing machine and a second exposing machine which expose respective pixels on said photosensitive body which is charged in accordance with said stored exposure data;

a first developing unit which develops toner of a first of two colors for pixels on said photosensitive body exposed by said first exposing machine;

a second developing unit which develops toner of a second of two colors different from said first of two colors for pixels on said photosensitive body exposed by said second exposing machine;

a transfer machine which transfers a toner image of developed four colors onto a printing medium;

a fixing machine which fixes said transferred toner image of four colors on said printing medium;

wherein at least one of said first developing unit and said second developing unit develops toner of one color or two colors in an exposed one pixel, and said fixing machine includes a belt and is configured to control said belt so that a relative speed difference occurs between said printing medium and said belt at a position along said belt at least where said developed toner of one color or two colors in one pixel of an image of said printing medium is fixed.

* * * * *